US008881977B1

(12) United States Patent
Paczkowski et al.

(10) Patent No.: US 8,881,977 B1
(45) Date of Patent: Nov. 11, 2014

(54) POINT-OF-SALE AND AUTOMATED TELLER MACHINE TRANSACTIONS USING TRUSTED MOBILE ACCESS DEVICE

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew Carl Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/802,383

(22) Filed: Mar. 13, 2013

(51) Int. Cl.
G06Q 20/00 (2012.01)
G06Q 40/02 (2012.01)
G06Q 20/10 (2012.01)

(52) U.S. Cl.
CPC ............ *G06Q 40/02* (2013.01); *G06Q 20/1085* (2013.01); *Y10S 902/08* (2013.01)
USPC .................................. 235/379; 705/43; 902/8

(58) Field of Classification Search
USPC .................................. 705/43; 902/8; 235/379
See application file for complete search history.

(56) References Cited

U.S. PATENT DOCUMENTS

| 5,303,378 | A | 4/1994 | Cohen |
| 6,219,712 | B1 | 4/2001 | Mann et al. |
| 6,668,322 | B1 | 12/2003 | Wood et al. |
| 6,823,454 | B1 | 11/2004 | Hind et al. |
| 6,824,064 | B2 | 11/2004 | Guthery et al. |
| 6,895,234 | B1 | 5/2005 | Laursen et al. |
| 7,650,645 | B1 | 1/2010 | Langendorf et al. |
| 7,873,837 | B1 | 1/2011 | Lee et al. |
| 7,895,642 | B1 | 2/2011 | Larson et al. |
| 8,238,823 | B2 | 8/2012 | Maugars et al. |

(Continued)

FOREIGN PATENT DOCUMENTS

| WO | 2013170228 A2 | 11/2013 |
| WO | 2014004590 A2 | 1/2014 |
| WO | 2014018575 A2 | 1/2014 |
| WO | 2014025687 A2 | 2/2014 |

OTHER PUBLICATIONS

Final Office Action dated Sep. 9, 2013, U.S. Appl. No. 13/440,980, filed Apr. 5, 2012.

(Continued)

*Primary Examiner* — Christle I Marshall

(57) ABSTRACT

A method for a mobile device to conduct a transaction with an unattended point-of-transaction device is disclosed. The method comprises transmitting to the unattended point-of-transaction device, via near field communication (NFC), information indicating that the transaction is being initiated; receiving from the unattended point-of-transaction device, via NFC, credentials indicating that the unattended point-of-transaction device is authorized to engage in the transaction; and transmitting to the unattended point-of-transaction device, via NFC, secure information indicating to the unattended point-of-transaction device that the mobile communication device is authorized to conduct the transaction. The secure information may be a PIN entered into the mobile device or a data record specifying an action to be performed by the unattended point-of-transaction device. The data record may be generated by the mobile device based on the entry into the mobile device of the PIN and information specifying the action to be performed by the unattended point-of-transaction device.

18 Claims, 8 Drawing Sheets

(56) References Cited

U.S. PATENT DOCUMENTS

| | | |
|---|---|---|
| 8,402,543 B1 | 3/2013 | Ranjan et al. |
| 8,429,409 B1 | 4/2013 | Wall et al. |
| 8,443,420 B2 | 5/2013 | Brown et al. |
| 8,494,576 B1 | 7/2013 | Bye et al. |
| 8,504,097 B1 | 8/2013 | Cope et al. |
| 8,632,000 B2* | 1/2014 | Laracey .................. 235/379 |
| 8,649,770 B1 | 2/2014 | Cope et al. |
| 8,667,607 B2 | 3/2014 | Paczkowski et al. |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0126225 A1 | 7/2003 | Camble et al. |
| 2003/0237002 A1 | 12/2003 | Oishi et al. |
| 2004/0233844 A1 | 11/2004 | Yu et al. |
| 2004/0243810 A1 | 12/2004 | Rindborg et al. |
| 2005/0015601 A1 | 1/2005 | Tabi |
| 2005/0138433 A1 | 6/2005 | Linetsky |
| 2005/0235166 A1 | 10/2005 | England et al. |
| 2006/0036851 A1 | 2/2006 | DeTreville |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0212503 A1 | 9/2008 | Lipford et al. |
| 2009/0055278 A1 | 2/2009 | Nemani |
| 2009/0070272 A1 | 3/2009 | Jain |
| 2009/0089449 A1 | 4/2009 | Day |
| 2009/0113425 A1 | 4/2009 | Ports et al. |
| 2009/0182634 A1 | 7/2009 | Park et al. |
| 2009/0193491 A1 | 7/2009 | Rao |
| 2009/0281947 A1 | 11/2009 | Erel |
| 2009/0300599 A1 | 12/2009 | Piotrowski |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0082977 A1 | 4/2010 | Boyle et al. |
| 2010/0128598 A1 | 5/2010 | Gandhewar et al. |
| 2010/0142517 A1 | 6/2010 | Montemurro et al. |
| 2010/0153721 A1 | 6/2010 | Mellqvist |
| 2010/0162028 A1 | 6/2010 | Frank et al. |
| 2010/0198943 A1 | 8/2010 | Harrang et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0281139 A1 | 11/2010 | Deprun |
| 2010/0299313 A1 | 11/2010 | Orsini et al. |
| 2010/0318802 A1 | 12/2010 | Balakrishnan |
| 2011/0014948 A1 | 1/2011 | Yeh |
| 2011/0021175 A1 | 1/2011 | Florek et al. |
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Florek et al. |
| 2011/0113479 A1 | 5/2011 | Ganem |
| 2011/0154032 A1 | 6/2011 | Mauro, II |
| 2011/0202916 A1 | 8/2011 | VoBa et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1* | 9/2011 | Varadarajan .................. 705/43 |
| 2011/0238992 A1 | 9/2011 | Jancula et al. |
| 2011/0246609 A1 | 10/2011 | Kim |
| 2011/0251892 A1 | 10/2011 | Laracey |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137119 A1 | 5/2012 | Doerr et al. |
| 2012/0143703 A1 | 6/2012 | Wall et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0258690 A1 | 10/2012 | Chen et al. |
| 2012/0266076 A1 | 10/2012 | Lockhart et al. |
| 2012/0266220 A1 | 10/2012 | Brudnicki et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0086684 A1 | 4/2013 | Mohler |
| 2013/0097302 A9 | 4/2013 | Khedouri et al. |
| 2013/0109307 A1 | 5/2013 | Reisgies et al. |

(56) References Cited

U.S. PATENT DOCUMENTS

| | | |
|---|---|---|
| 2013/0117186 A1 | 5/2013 | Weinstein et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0212704 A1 | 8/2013 | Shablygin et al. |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0345530 A1 | 12/2013 | McRoberts et al. |
| 2014/0033316 A1 | 1/2014 | Paczkowski et al. |
| 2014/0047548 A1 | 2/2014 | Bye et al. |
| 2014/0188738 A1 | 7/2014 | Huxham |

OTHER PUBLICATIONS

Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
Faipp Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 141090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/ media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Faipp Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
Faipp Pre-Interview Communication dated Jun. 12, 2013, U.S. Appl. No. 13/440,980, filed Apr. 5, 2012.
Faipp Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
Faipp Pre-Interview Communication dated Jul. 25, 2013, U.S. Appl. No. 13/470,203, filed May 11, 2012.
Faipp Pre-Interview Communication dated Jun. 6, 2013, U.S. Appl. No. 13/571,348, filed Aug. 10, 2012.
Faipp Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed.Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Trusted Security Zone Re-Provisioning and Re-Use Capability for Refurbished Mobile Devices", filed Mar. 14, 2013, U.S. Appl. No. 13/831,486.

(56) References Cited

OTHER PUBLICATIONS

Paczkowski, Lyle W., et al., "Trusted Security Zone Enhanced with Trusted Hardware Drivers", filed Mar. 13, 2013, U.S. Appl. No. 13/802,404.

Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.

Paczkowski, Lyle W., et al., "JTAG Fuse Vulnerability Determination and Protection Using a Trusted Execution Environment", filed Mar. 15, 2013, U.S. Appl. No. 13/844,325.

Paczkowski, Lyle W., et al., "Trusted Security Zone Containers for the Protection and Confidentiality of Trusted Service Manager Data", filed Mar. 14, 2013, U.S. Appl. No. 13/831,463.

Bye, Stephen James, et al., "Delivering Digital Content to a Mobile Device via a Digital Rights Clearing House", filed Apr. 10, 2013, U.S. Appl. No. 13/860,338.

Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.

Paczkowski, Lyle W., et al., "Verifying Applications Using a Trusted Security Zone", filed Aug. 12, 2013, U.S. Appl. No. 13/964,112.

Paczkowski, Lyle W., et al., "Mobile Access Terminal with Local Call Session Contgrol Function", filed Jun. 18, 2009, U.S. Appl. No. 12/486,873.

Zimmerman, Ann, "Check Out the Future of Shopping", The Wall Street Journal, Business, May 18, 2011, http://online.wsj,com/article/SB10001424052748703421204576329253050634700.html.

Garry, Michael, Kroger Test Prepares for Mobile Future:, SN, Supermarket News, Jun. 13, 2011, http://supermarketnews.com/technology/kroger-test-prepares-mobile-future.

Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.

Faipp Pre-Interview Communication dated Mar. 20, 2014, U.S. Appl. No. 13/482,731, filed May 29, 2012.

Final Office Action dated Mar. 27, 2014, U.S. Appl. No. 13/470,203, filed May 11, 2012.

Notice of Allowance dated Jan. 28, 2014, U.S. Appl. No. 12/486,873, filed Jun. 18, 2009.

Paczkowski, Lyle W., et al., "Trusted Security Zone Access to Peripheral Devices", filed Jan. 6, 2014, U.S. Appl. No. 14/148,714.

Notice of Allowance dated May 27, 2014, U.S. Appl. No. 13/482,731, filed May 29, 2012.

Advisory Action dated May 29, 2014, U.S. Appl. No. 13/470,203, filed May 11, 2012.

Faipp Pre-Interview Communication dated May 12, U.S. Appl. No. 13/294,177, filed Nov. 11, 2011.

Final Office Action dated Apr. 10, 2014, U.S. Appl. No. 13/571,348, filed Aug. 10, 2012.

Foreign Communication from a Related Counterpart—International Search Report and Written Opinion, dated Apr. 22, 2014, PCT/US13/53617, filed on Aug. 5, 2013.

Advisory Action dated Jun. 23, 2014, U.S. Appl. No. 13/571,348, filed Aug. 10, 2012.

Notice of Allowance dated Jun. 4, 2014, U.S. Appl. No. 13/557,213, filed Jul. 25, 2012.

FAIPP Pre-Interview Communication dated Aug. 4, 2014, U.S. Appl. No. 13/844,357, filed Mar. 15, 2013.

Restriction Requirement dated Aug. 14, 2014, U.S. Appl. No. 13/594,777, filed Aug. 25, 2012.

FAIPP Pre-Interview Communication dated Jul. 17, 2014, U.S. Appl. No. 13/594,778, filed Aug. 25, 2012.

FAIPP Pre-Interview Communication dated Jul. 17, 2014, U.S. Appl. No. 13/594,779, filed Aug. 25, 2012.

FAIPP Pre-Interview Communication dated Aug. 6, 2014, U.S. Appl. No. 13/831,486, filed Mar. 14, 2013

Foreign Communication from a Related Counterpart—International Search Report and Written Opinion, dated Jul. 11, 2014, PCT/US14/16651, filed on Feb. 16, 2014.

\* cited by examiner

POINT-OF-SALE AND AUTOMATED TELLER MACHINE TRANSACTIONS USING TRUSTED MOBILE ACCESS DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Automated teller machines (ATMs) and similar devices typically use a two-factor authentication procedure to ensure the security of financial transactions. In two-factor authentication, a person seeking to engage in a secure transaction provides an item in two of three categories: something the person has, such as a debit card, something the person knows, such as a password, and something the person is, such as biometric information. For ATM transactions, the first factor is typically an ATM card or a similar card that is maintained in the possession of the person and that includes information encoded in a magnetic strip on the ATM card. The encoded information might include information about the card user's identity, information about the card user's bank account, or other information needed for a financial transaction. Such information will be referred to herein as account information. The second factor is typically a personal identification number (PIN) that is kept secret by the card user and that the card user enters into an ATM after inserting an ATM card into the ATM. If the PIN is appropriate for the account, the transaction is allowed to proceed. Any such second factor in a two-factor authentication procedure will be referred to herein as a PIN, but it should be understood that other types of information may be a used as a second factor.

Devices other than ATMs may use similar two-factor authentication procedures involving the entry of account information and a PIN. For example, the pumps at gas stations may accept a debit card for the entry of account information and the entry of a PIN on a keypad as a second factor. ATMs and unattended point-of-sale devices such as gas pumps typically use a central clearinghouse to manage transactions, thus allowing numerous different types of ATM cards, debit cards, or credit cards to be used in a single device. As used herein, the term "ATM" or "unattended point-of-transaction device" may refer to any such ATM or unattended point-of-sale device, and the term "ATM card" may refer to any card accepted by such a device. Also, while the discussion herein may focus on the withdrawal of cash from an ATM, it should be understood that similar considerations may apply to other types of ATM transactions and to obtaining other types of goods or services from other types of unattended point-of-transaction devices.

SUMMARY

In an embodiment, a method for a mobile communication device to conduct a transaction with an unattended point-of-transaction device is disclosed. The method comprises transmitting to the unattended point-of-transaction device, via near field communication (NFC), information indicating that the transaction is being initiated; receiving from the unattended point-of-transaction device, via NFC, credentials indicating that the unattended point-of-transaction device is authorized to engage in the transaction; and transmitting to the unattended point-of-transaction device, via NFC, secure information indicating to the unattended point-of-transaction device that the mobile communication device is authorized to conduct the transaction. The secure information may be at least one of a PIN entered into a user interface on the mobile communication device and associated with an account associated with the transaction or a data record specifying an action to be performed by the unattended point-of-transaction device. The data record may be generated by the mobile communication device based on the entry into the mobile communication device of the PIN and information specifying the action to be performed by the unattended point-of-transaction device.

In another embodiment, an alternative method for a mobile communication device to conduct a transaction with an unattended point-of-transaction device is disclosed. The method comprises establishing a secure wireless telecommunications link between the mobile communication device and an entity that manages the unattended point-of-transaction device and transmitting confidential information over the link. The confidential information may comprise information that establishes the authorization of the mobile communication device to interact with the unattended point-of-transaction device and information regarding an action the unattended point-of-transaction device is requested to perform in conducting the transaction. The action the unattended point-of-transaction device is requested to perform and at least a portion of the information that establishes the authorization of the mobile communication device to interact with the unattended point-of-transaction device may have been entered into a user interface on the mobile communication device. The method further comprises receiving from the entity that manages the unattended point-of-transaction device a transaction identifier that uniquely identifies the transaction. The method further comprises transmitting the transaction identifier to the unattended point-of-transaction device via an NFC transmission.

In another embodiment, a telecommunications device is disclosed. The telecommunications device comprises a memory, a processor, and an application stored in the memory and executable by the processor. The application is configured such that the telecommunications device establishes a secure wireless telecommunications link between the telecommunications device and an entity that manages an unattended point-of-transaction device. The application is further configured such that the telecommunications device transmits confidential information over the link. The confidential information may comprise information that establishes the authorization of the telecommunications device to conduct a transaction with the unattended point-of-transaction device and information regarding an action the unattended point-of-transaction device is requested to perform in conducting the transaction. The information regarding the action the unattended point-of-transaction device is requested to perform and at least a portion of the information that establishes the authorization of the telecommunications device to interact with the unattended point-of-transaction device may have been entered into a user interface on the telecommunications device. The application is further configured such that the telecommunications device receives from the entity that manages the unattended point-of-transaction device a transaction identifier that uniquely identifies the transaction. The application is further configured such that the telecommunications device transmits the transaction identifier to the unattended point-of-transaction device via an NFC transmission. In an embodiment, the transaction identifier becomes invalid after the transaction is complete.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
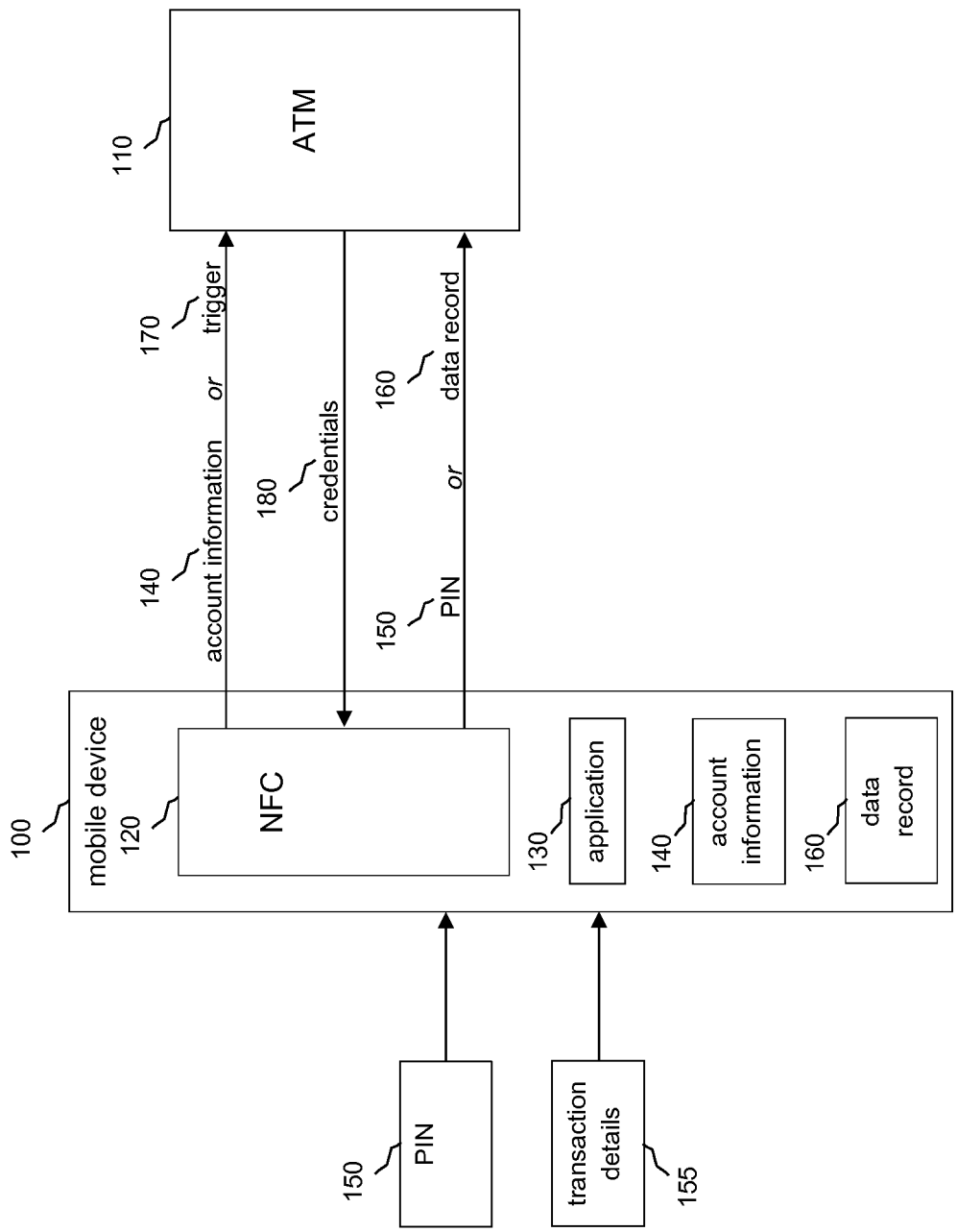
FIG. 1 illustrates interactions between an ATM and a mobile device suitable for implementing the several embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Disclosed herein are a plurality of embodiments that use near-field communication (NFC) or a similar technology to transmit transaction-related information between a mobile device, such as a smart phone, a tablet computer, or a similar device, and an ATM. In one set of embodiments, traditional procedures for using ATMs are enhanced by the use of NFC to transmit confidential information from a mobile device to an ATM. More specifically, a mobile device user may enter a PIN into a mobile device at a location remote from an ATM at which the user intends to engage in a financial transaction. The user may then approach the ATM and bring the mobile device into contact or near contact with an NFC-enabled component in the ATM. The PIN may then be transmitted to the ATM via NFC. Alternatively, as described in more detail below, a data record may be generated based on the PIN, and the data record may be transmitted to the ATM via NFC. In either case, the transaction may then proceed in the traditional manner as if the PIN had been entered via a keypad on the ATM. To prevent unauthorized use of the PIN, a limit may be imposed on the length of time the PIN is available for transmission via NFC after being entered into the mobile device. To prevent the PIN from being transmitted via NFC to an apparatus other than the ATM to which the PIN is intended to be transmitted, the ATM may provide credentials to the mobile device to verify that the ATM is legitimate. An application on the mobile device may manage the entry of the PIN into the mobile device, the transmission of the PIN to the ATM via NFC, and other functions related to an NFC-based ATM transaction.

In another set of embodiments, a secure, wireless telecommunications link is established between a mobile device and a bank or a similar institution associated with an ATM, wherein the ATM is not in the path of the secure, wireless telecommunications link. When a mobile device user wishes to initiate a financial transaction with the bank, the user may use the secure link to provide the bank with information equivalent to that which would typically be provided in a traditional ATM transaction, such as account information and a PIN. The bank may then provide the mobile device with a transaction identifier or a similar token that authorizes and identifies the transaction. The user may then use the mobile device to send the transaction identifier, via NFC, to an ATM. In an embodiment, the mobile device may identify the ATM by an NFC handshake with the ATM. In an embodiment, the mobile device may verify the ATM to which it will send the transaction identifier based on looking up the identity of a proximate ATM and comparing that identity to the identity provided by the NFC handshake. For example, the mobile device may self-locate (for example determining its position via GPS locating, by trilateration with proximate cell towers, or by other means) and after self-locating, look up an ATM that is closest to the present location of the mobile device. Upon confirming the legitimacy of the transaction identifier, the ATM may complete the transaction identified by the transaction identifier. The transaction identifier may be used only once to prevent fraudulent use of the transaction identifier. A length of time or a window of time in which the transaction identifier is available for transmission may be set. A geographical restriction specifying one or more locations where the transaction identifier is available for transmission may also be set. An application on the mobile device may manage the entry of the PIN into the mobile device, the transmission of confidential information to the bank via the secure link, the transmission of the transaction identifier to the ATM via NFC, and other functions related to an NFC-based ATM transaction.

Numerous techniques have been devised to fraudulently obtain money from ATMs. For example, the card reader on an ATM may be inconspicuously covered by a second card reader that is under the control of a malefactor. When a card user inserts an ATM card into the ATM, the account information on the card may be read by both the legitimate card reader and the second card reader. The malefactor may then be able to obtain the user's account information from the second card reader. The malefactor may also inconspicuously install a second keypad on top of the ATM's legitimate keypad, and the second keypad may record the keystrokes the card user makes in entering the PIN. The malefactor may later retrieve the keystrokes from the second keypad and thus learn the user's PIN. Alternatively, the malefactor may install a video camera in an inconspicuous location near the ATM and may point the video camera toward the ATM's keypad. The video camera may record the card user's motions as the user is entering a PIN into the ATM, and by viewing the video recording the malefactor may be able to discern the user's PIN. With the knowledge of the user's account information and PIN, the malefactor may be able to fraudulently withdraw money from the user's bank account.

The embodiments disclosed herein can prevent or discourage such fraudulent capture of confidential information. The embodiments, at least in part, make use of NFC or a similar technology to transmit confidential information between a mobile device and an ATM. NFC is a system for transmitting data between two devices or between a device and a passive data record wherein, when two NFC-enabled components are brought within a few centimeters of one another, data may be transmitted between the components in a high-frequency radio signal. As used herein, the term "NFC" may refer to any current or future system that uses such a short-range data transmission technique.

In an embodiment, rather than a PIN being entered into a keypad on an ATM in the traditional manner, the PIN is entered into a mobile device. The PIN or information made secure by the entry of the PIN is transferred at a later time to an ATM via NFC. The entry of the PIN into the mobile device rather than the keypad on the ATM may prevent the interception of the PIN by a malefactor. For example, a mobile device user may enter a PIN into the mobile device while in a location remote from the ATM, such as at home or in an automobile, and may later approach the ATM. Since the PIN is not entered into the ATM's keypad, an illegitimate keypad on the ATM could not record the PIN. Any video cameras that may have been placed by a malefactor near the ATM would not have a view of the user's motions in the remote location. Alternatively, the user may enter the PIN into the mobile device while near an ATM but may position the mobile device in such a manner during the PIN entry that the mobile device's keypad is unlikely to be seen by any cameras that may be present. For instance, the user may turn away from the ATM or may hold the mobile device close to the body while entering the PIN.

FIG. 1 illustrates a mobile device 100 that may be used to interact with an ATM 110 in such a manner. The mobile device 100 may be a mobile phone, a smart phone, a tablet computer, a media player, or a similar mobile communication device. The mobile device 100 includes a component 120 capable of transmitting and receiving data via NFC and capable of processing data in accordance with NFC standards. This component 120 will be referred to hereinafter as the NFC component 120.

The mobile device 100 also includes an application 130 that may be used to initiate and manage NFC-based transactions with the ATM 110. A bank or other institution that manages the ATM 110 may have created or may otherwise be in control of the application 130 and may provide the application 130 to its customers for use in conducting NFC-based transactions with the bank's ATMs. Since the application 130 is under the control of the bank, the bank may ensure that interactions between the ATM 110 and any mobile device 100 that executes the application 130 are conducted in a secure manner.

In addition, the mobile device 100 may include account information 140 stored in a secure memory location in the mobile device 100 and available for retrieval only by the application 130 when a user of the mobile device 100 initiates an NFC-based ATM transaction. The account information 140 may be encrypted and may be similar to the account information that is typically stored on a magnetic strip on an ATM card.

In an embodiment, when a user of the mobile device 100 wishes to initiate a transaction with the ATM 110, the user may launch the application 130. The application 130 may then manage the entry of transaction-related data into the mobile device 100. For example, the application 130 may cause to be displayed on a display screen of the mobile device 100 instructions prompting the user to enter a PIN 150 into the keypad or some other user interface on the mobile device 100. The user may then enter the PIN 150 into the mobile device 100, preferably in a location or in a manner that prevents the entry from being observed or recorded.

In an embodiment, only the PIN 150 is entered, and the PIN 150 is temporarily and securely stored in the mobile device 100 for later transfer to the ATM 110 via NFC. In another embodiment, in addition to entering the PIN 150, the user, via the application 130, enters details 155 regarding the requested ATM transaction, such as an amount of cash requested, an account whose balance is requested, or some other action that the ATM 110 is requested to take. In the latter embodiment, the application 130 may analyze the PIN 150 and confirm that the PIN 150 is appropriate for the account information 140. The application 130 may then generate a data record 160 that contains the transaction details 155 entered by the user. The data record 160 may be readable only by the application 130, a complementary application on the ATM 110, and/or some other component under the control of the entity that manages the ATM 110. The data record 160 may be temporarily stored in a secure memory location in the mobile device 100 for later transfer to the ATM 110 via NFC.

In some embodiments, the data record 160 may include the PIN 150 and the transaction details 155. In these embodiments, the PIN 150 may be transferred from the data record 160 to the ATM 110 as the second factor in a two-factor authentication procedure for authenticating the user of the mobile device 100 to the ATM 110. After the ATM 110 accepts the PIN 150, the transaction details 155 may be transferred from the data record 160 to the ATM 110.

In other embodiments, the secure data record 160 may include only the transaction details 155 and not the PIN 150. That is, since the data record 160 was generated only after the application 130 determined that the PIN 150 was valid, the data record 160 may have the same level of security and confidentiality as the PIN 150 and may act as a substitute for the PIN 150 in authenticating the user of the mobile device 100 to the ATM 110. In such cases, there may be no need to transmit the actual PIN 150 from the mobile device 100 to the ATM 110, and the ATM 110 may accept the data record 160 as the second factor in a two-factor authentication procedure.

After entering the PIN 150 and possibly the transaction details 155, the user may initiate an ATM transaction by bringing the mobile device 100 into close enough proximity to the ATM 110 for an NFC transmission to occur from the mobile device 100 to the ATM 110. In some embodiments, the user may perform an action on the mobile device 100, such as pressing one or more buttons or speaking a voice command, to initiate an NFC transmission from the mobile device 100 to the ATM 110. In other embodiments, the application 130 may be aware that an ATM transaction is pending and may initiate an NFC transmission automatically when the mobile device 100 is brought near the ATM 110.

In either way of initiating the NFC transmission, two different types of information may be transmitted in the NFC transmission from the mobile device 100 to the ATM 110 to initiate the ATM transaction. In one embodiment, the encrypted account information 140 may be sent to the ATM 110 via NFC to inform the ATM 110 that an ATM transaction is being initiated. The transmission of the account information 140 via NFC may be viewed as being similar to a user providing equivalent account information to an ATM by inserting an ATM card into an ATM.

In another embodiment, a transaction triggering signal 170 may be sent to the ATM 110 via NFC to inform the ATM 110 that an ATM transaction is being initiated. The trigger 170 may be a code or other piece of information prearranged between the application 130 and the entity that controls the ATM 110 to indicate that an NFC-based ATM transaction is being requested. If the ATM transaction is initiated by the transmission of the trigger 170 rather than by the transmission of the account information 140, the account information 140 may be transmitted from the mobile device 100 to the ATM 110 at a later time in another NFC transmission.

Before the ATM transaction is allowed to proceed beyond this point, a trust relationship may be established between the mobile device 100 and the ATM 110 to ensure the mobile device 100 that the ATM 110 is legitimate. That is, in addition to the mobile device 100 authenticating itself to the ATM 110 via two-factor authentication, the ATM 110 may verify that it is a legitimate device under the control of a bank or similar institution rather than a device that has been placed on or near the ATM 110 by a malefactor in an attempt to intercept NFC transmissions from the mobile device 100.

In an embodiment, the trust relationship may be established by the ATM 110 providing credentials 180 to the mobile device 100 via an NFC transmission from the ATM 110 to the mobile device 100. The application 130 may analyze the credentials 180 to confirm the authenticity of the ATM 110. Since the ATM 110 and the application 130 are both under the control of the same bank, this authentication procedure may proceed in any manner designated by the bank and thus is unlikely to be vulnerable to tampering by an outside party.

When the application 130 has confirmed the authenticity of the ATM 110 through the analysis of the credentials 180, the ATM transaction may proceed with a transmission of secure information, either the PIN 150 or the data record 160, from the mobile device 100 to the ATM 110. In the embodiment where the user entered only the PIN 150 into the mobile device 100, the PIN 150 is transmitted from the mobile device 100 to the ATM 110 via NFC. The user may then enter the transaction details 155 into the ATM 100 in the traditional manner.

In the embodiment where the secure data record 160 was generated based on the PIN 150 and the transaction details 155 entered by the user, the secure data record 160 is transmitted from the mobile device 100 to the ATM 110 via NFC. In this embodiment, as described above, the PIN 150 may be transferred from the data record 160 to the ATM 110 and, after the PIN 150 has been verified, the transaction details 155 may be transferred from the data record 160 to the ATM 110. Alternatively, the data record 160 may not include the PIN 150 and may act as the second factor in a two-factor authentication procedure instead of the PIN 150. In this case, the transaction details 155 may be transferred from the data record 160 to the ATM 110 without an entry of the PIN 150 into the ATM 110. In any of these embodiments, the ATM 110 may then perform the actions specified by the transaction details 155.

In an embodiment, a time limit may be imposed on how long the PIN 150 remains valid after being entered into the mobile device 100 or on how long the data record 160 remains valid after being generated by the mobile device 100. If a user of the mobile device 100 enters the PIN 150 into the mobile device 100 and then loses the mobile device 100 or has the mobile device 100 stolen, a person who has found or stolen the mobile device 100 may be able to bring the mobile device 100 into the proximity of the ATM 110, initiate an NFC transmission that sends the PIN 150 or the data record 160 to the ATM 110, and fraudulently obtain cash from the ATM 110. To prevent such a fraudulent withdrawal, the availability of the PIN 150 or the data record 160 may expire after a predefined amount of time, such as ten seconds, thirty seconds, one minute, or some other appropriate expiration time. After the expiration time has elapsed, the PIN 150 or the data record 160 may be erased from its memory location in the mobile device 100 or may otherwise be made unavailable for transmission via NFC. The expiration time may be definable by the user of the mobile device 100. Alternatively, the time limit may be imposed and controlled by the application 130 based on restrictions specified by the bank that manages the ATM 110 and the application 130. For example, the bank may specify that the application 130 is to erase the PIN 150 or the data record 160 after a predefined length of time. If the user attempts to initiate an ATM transaction via NFC after the predefined time, an error message may be displayed on the mobile device 100 or the transaction may simply fail to initiate.

Figure 2:
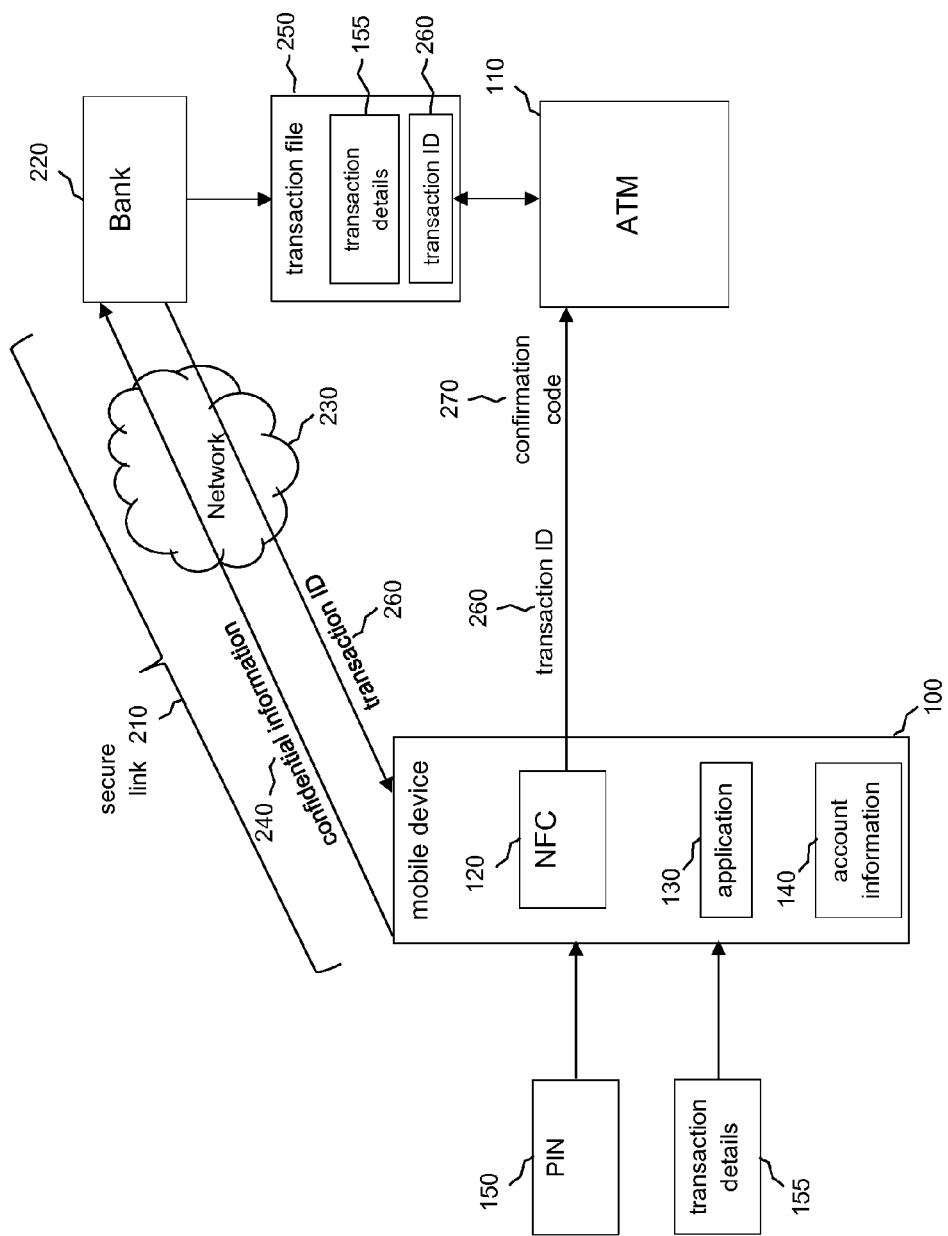
FIG. 2 illustrates alternative interactions between an ATM and a mobile device suitable for implementing the several embodiments of the disclosure.

FIG. 2 illustrates another set of embodiments in which NFC may be used in ATM transactions. In this case, when a user of the mobile device 100 wishes to conduct a transaction with the ATM 110, a secure telecommunications link 210 is established between the mobile device 100 and a bank 220 or similar institution that manages the ATM 110. The link 210 may pass through a wireless telecommunications network 230 and one or more other intermediary components not shown. A secure link is established between each successive pair of intermediary components in the overall link 210, thus ensuring that the overall link 210 is secure and preventing the interception of data transmitted over the link 210. In an embodiment, the establishment of the secure link 210 may be initiated by launching the application 130, by selecting an appropriate option in the application 130, by entering appropriate information into the application 130, or in some other manner. In an embodiment, the secure link 210 may comprise a "trust zone", wherein each component in the secure link 210 adds a trust token to a message and passes the message to a subsequent component, wherein the message also includes the tokens received from previous components. Such a trust zone is described in U.S. patent application Ser. No. 13/532,588, which is incorporated herein by reference as if reproduced in its entirety.

When the secure link 210 has been established, the ATM transaction may proceed with an exchange of information between the mobile device 100 and the bank 220 over the secure link 210. In an embodiment, the user of the mobile device 100 transmits confidential information 240 to the bank 220 to establish the identity of the user and the user's authorization to conduct a transaction with the ATM 110. The confidential information 240 may include the account information 140 stored on the mobile device 100 and the PIN 150 recently entered into the mobile device 100, as in the case of FIG. 1. Alternatively, the confidential information 240 may include a user identity and a password or some other mechanism for verifying the identity and authority of the user, such as biometric information. In the latter cases, at least a portion of the account information 140 may be stored at the bank 220 rather than being stored on the mobile device 100. The confidential information 240 may also include transaction details 155 entered into the mobile device 100 by the user, such as an amount of cash requested for withdrawal, an account for which a balance is requested, or some other action the ATM 110 is requested to perform. Such transaction details 155 may be entered via the application 130.

Stated more broadly, the confidential information 240 may comprise information that establishes the authorization of the mobile device 100 to interact with the ATM 110 and information regarding an action the ATM 110 is requested to perform. The information that establishes the authorization of the mobile device 100 to interact with the ATM 110 may be an account number and a PIN, a user identifier and a password, biometric information, or some other type of identification and authorization information. The action the ATM 110 is requested to perform and at least a portion of the information that establishes the authorization of the mobile device 100 to interact with the ATM 110, for example the PIN 150, may have previously been entered into a user interface on the mobile device 100.

The bank 220 may analyze the confidential information 240 provided by the mobile device 100 over the secure link 210 and determine whether the user is authorized to perform the actions specified in the transaction details 155. If the user is authorized, the bank 220 may generate a secure transaction file 250 or a similar secure record containing the transaction details 155. The bank 220 may assign a unique transaction identifier 260 to the transaction file 250. The bank 220 may then transmit the transaction identifier 260 to the mobile device 100 over the secure link 210. The bank 220 may also make the transaction file 250 available to the ATM 110 so that the ATM 110 is aware of the transaction identifier 260 and the transaction details 155. While the transaction file 250 is shown outside the bank 220, the transaction file 250 may be stored in a secure location within the bank's computer systems and may be available to the ATM 110 over a secure, wireless telecommunications link, a secure wired link, or some other type of secure link.

After receiving the transaction identifier 260 over the secure link 210, the mobile device 100 may send the transaction identifier 260 to the ATM 110 via an NFC transmission. In some embodiments, to further verify the identity of the mobile device user and ensure that the user is authorized to make the transaction identified by the transaction identifier 260, the mobile device 100 may also send a confirmation code 270 to the ATM 110 via NFC. The confirmation code 270 may be a PIN, a password, or some other confidential information entered into the mobile device 100 by the user and known by the ATM 110 as a verification of the authenticity of mobile device 100. Alternatively, the confirmation code 270 may be an identifier associated with the mobile device 100, such as an International Mobile Equipment Identity (IMEI) number or a similar device identity number known by the ATM 110 as a verification of the authenticity of mobile device 100.

After receiving the transaction identifier 260 in the NFC transmission from the mobile device 100, the ATM 110 may compare the transaction identifier 260 received from the mobile device 100 to the transaction identifier 260 known by the ATM 110 to be associated with the transaction file 250. If the transaction identifiers 260 match, the ATM 110 may complete the transaction described by the transaction details 155 in the transaction file 250.

In the embodiments of FIG. 2, the decisions regarding whether to allow a requested transaction to proceed are made almost entirely by the bank 220. Other than comparing the transaction identifier 260 received from the mobile device 100 to the transaction identifier 260 known to be associated with the transaction file 250, the ATM 110 may merely follow the instructions specified in the transaction file 250 and act as a cash dispenser or a display mechanism rather than as a decision maker as in the cases of FIG. 1 and traditional ATM transactions. Also, in the embodiments of FIG. 2, a trust relationship is established between the mobile device 100 and the bank 220 rather than between the mobile device 100 and the ATM 110 as in the case of FIG. 1.

In an embodiment, a unique transaction identifier 260 is generated for each transaction and is used only once. That is, the transaction identifier 260 becomes invalid after the transaction associated with the transaction identifier 260 is complete. In this way, if the transaction identifier 260 is intercepted in a transmission from the bank 220 to the mobile device 100 or from the mobile device 100 to the ATM 110, the transaction identifier 260 is unlikely to be useful to the interceptor since the transaction identifier 260 is likely to have already been used by the user of the mobile device 100 and would therefore no longer be valid. In an embodiment, the application 130 may be capable of determining when a transaction is complete and may erase the transaction identifier 260 or otherwise render the transaction identifier 260 unusable after the completion of a transaction.

The transaction identifier 260 may have an expiration time similar to the expiration time of the PIN 150 entered into or the data record 160 generated by the mobile device 100 in the embodiments of FIG. 1. That is, there may be a time limit, for example ten seconds, thirty seconds, one minute, or some other appropriate time, on how long the transaction identifier 260 remains valid after being received by the mobile device 100 from the bank 220. The limit on the length of time that the transaction identifier 260 can be used may prevent a person who finds or steals the mobile device 100 from using the mobile device 100 to enter the transaction identifier 260 into and fraudulently gain access to the ATM 110.

Alternatively or additionally, the transaction identifier 260 may be designated to be valid only during a specified window of time in the future. For example, the user of the mobile device 100 may wish to establish the secure link 210, transmit the confidential information 240, and receive the transaction identifier 260 while the user is in the user's home network but may wish to provide the transaction identifier 260 to the ATM 110 at a later time when the user will be out of the user's home network. In an embodiment, the user may designate a time period during which the transaction identifier 260 may be used. For instance, the user may specify that the transaction identifier 260 should be valid only for a one hour period starting one hour from the present time, only for a thirty minute period starting two hours from the present time, all of the next day starting at midnight, or some other combination of a time period and a starting time for the time period. As with the embodiments of FIG. 1, the expiration time or the expiration window may be imposed and controlled by the application 130 based on restrictions specified by the bank that manages the ATM 110 and the application 130.

Alternatively or additionally, geographic restrictions may be placed on the use of the transaction identifier 260. That is, if the mobile device 100 is equipped with a positioning system that allows the geographic location of the mobile device 100 to be determined, the user of the mobile device 100 may specify that the transaction identifier 260 may be used only when the mobile device 100 is present at one or more designated locations. For example, the user of the mobile device 100 may specify that the transaction identifier 260 may be used only when the mobile device 100 is at a geographic location near one or more ATMs that the user typically uses. The user may use the application 130 to enter an address, geographic coordinates, or other location information for the ATMs at which the transaction identifier 260 may be used.

The application 130 may then interact with the positioning system on the mobile device 100 to determine when the mobile device 100 is within a specified distance of one of the specified locations and may allow the transaction identifier 260 to be used only when the mobile device 100 is within the specified distance of a specified location. If the transaction identifier 260 is received by the mobile device 100 and the mobile device 100 is lost or stolen before the transaction identifier 260 is used, a person who has found or stolen the mobile device 100 would not be able to use the mobile device 100 to make a withdrawal at any ATM other than the ATMs designated by the user. Since the person would be unlikely to be aware of which ATMs had been designated to allow use of the transaction identifier 260, the person would be unlikely to be able to make a fraudulent withdrawal.

In an embodiment, a geographic restriction and a time restriction may be used in combination. For example, the user may plan to visit another city on a certain day and may specify that the transaction identifier 260 may be used in any location in that city but only on that day.

In the embodiments of both FIG. 1 and FIG. 2, the application 130 may have the capability to manage some or all of the functions related to conducting NFC-based ATM transactions. For example, in FIG. 1, the application 130 may oversee the NFC-based transmission of the account information 140, the trigger 170, the PIN 150, and/or the data record 160 and the NFC-based reception of the credentials 180. In FIG. 2, the application 130 may oversee the transmission of the confidential information 240 over the secure link 210, the reception of the transaction identifier 260 over the secure link 210, and the NFC-based transmission of the transaction identifier 260 to the ATM 110. In either FIG. 1 or FIG. 2, the application 130 may also oversee the storage and retrieval of the account information 140. For example, as part of the installation of the application 130 on the mobile device 100, a bank or other entity that manages the ATM 110 may store the account information 140 in a secure memory location in the mobile device 100. The account information 140 may then be accessible only to the application 130 and not to the user of the mobile device 100. The application 130 may also ensure that the PIN 150, the data record 160, the transaction identifier 260, and any other secure information that may be entered into, generated by, or received by the mobile device 100 are deleted after use.

Figure 3:
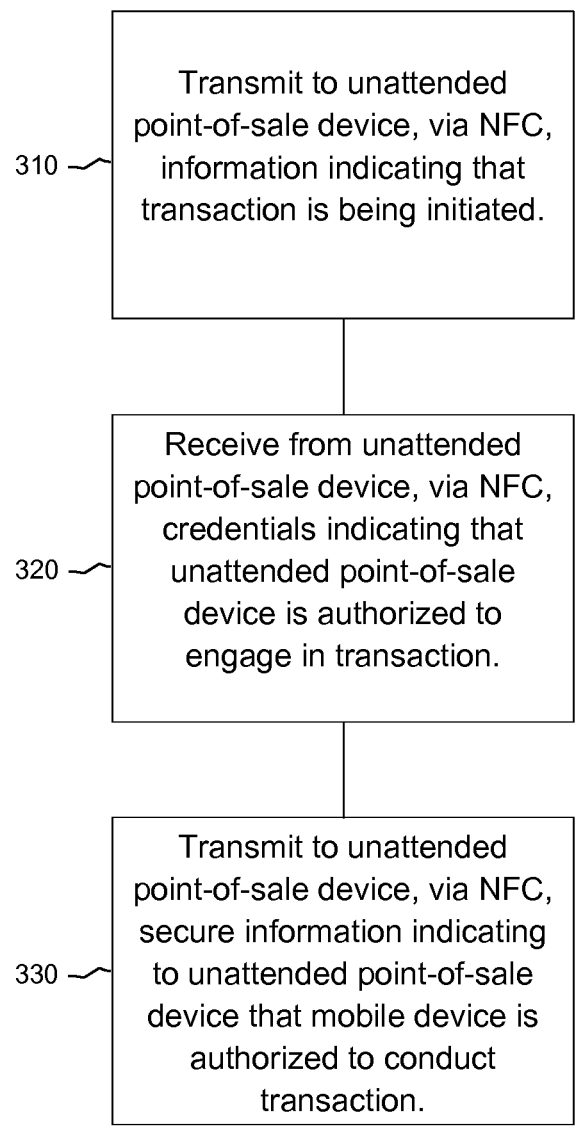
FIG. 3 illustrates a method for a mobile device to conduct a transaction with an unattended point-of-transaction device according to an embodiment of the disclosure.

FIG. 3 illustrates a method for a mobile device to conduct a transaction with an unattended point-of-transaction device according to an embodiment of the disclosure. At block 310, information indicating that the transaction is being initiated is transmitted to the unattended point-of-transaction device via NFC. At block 320, credentials indicating that the unattended point-of-transaction device is authorized to engage in the transaction are received from the unattended point-of-transaction device via NFC. At block 330, secure information indicating to the unattended point-of-transaction device that the mobile device is authorized to conduct the transaction is transmitted to the unattended point-of-transaction device via NFC. The secure information is at least one of a PIN entered into a user interface on the mobile device and associated with an account associated with the transaction or a data record specifying an action to be performed by the unattended point-of-transaction device. The data record may be generated by the mobile device based on the entry into the mobile device of the PIN and information specifying the action to be performed by the unattended point-of-transaction device.

Figure 4:
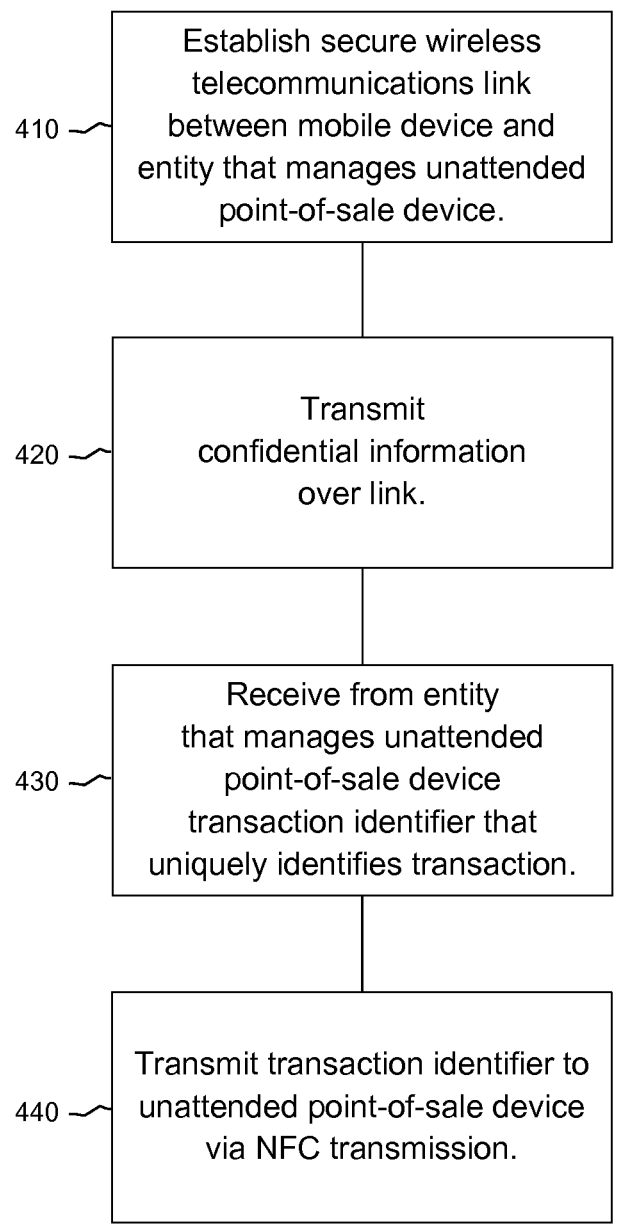
FIG. 4 illustrates a method for a mobile device to conduct a transaction with an unattended point-of-transaction device according to an alternative embodiment of the disclosure.

FIG. 4 illustrates a method for a mobile device to conduct a transaction with an unattended point-of-transaction device according to an alternative embodiment of the disclosure. At block 410, a secure wireless telecommunications link is established between the mobile device and an entity that manages the unattended point-of-transaction device. At block 420, confidential information is transmitted over the link. The confidential information may comprise information that establishes the authorization of the mobile device to interact with the unattended point-of-transaction device and information regarding an action the unattended point-of-transaction device is requested to perform in conducting the transaction. The action the unattended point-of-transaction device is requested to perform and at least a portion of the information that establishes the authorization of the mobile device to interact with the unattended point-of-transaction device may have been entered into a user interface on the mobile device. At block 430, a transaction identifier that uniquely identifies the transaction is received from the entity that manages the unattended point-of-transaction device. At block 440, the transaction identifier is transmitted to the unattended point-of-transaction device via an NFC transmission.

Figure 5:
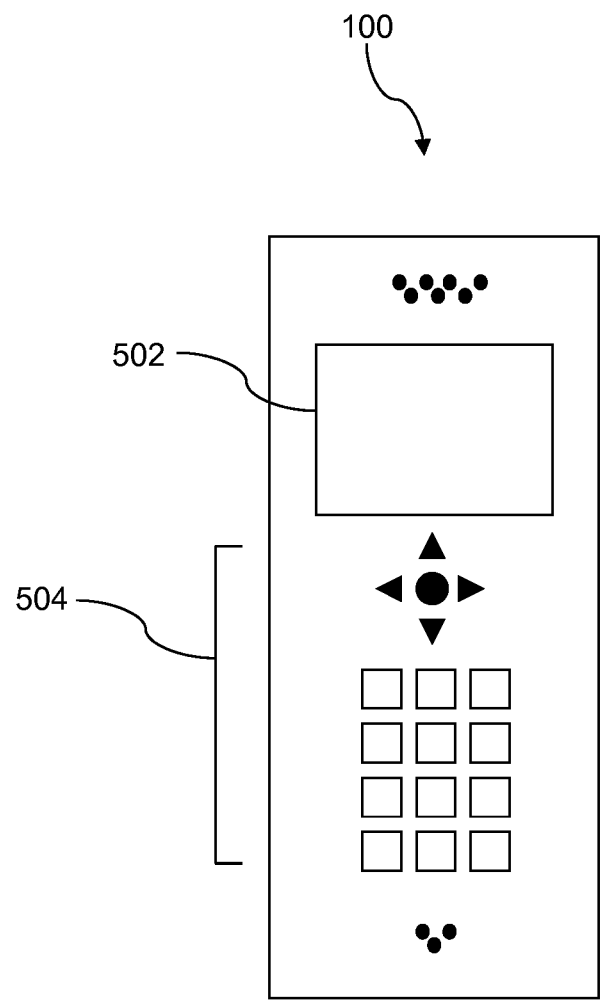
FIG. 5 depicts a mobile device system suitable for implementing the several embodiments of the disclosure.

FIG. 5 depicts the mobile device 100, which is operable for implementing aspects of the present disclosure, but the present disclosure should not be limited to these implementations. Though illustrated as a mobile phone, the mobile device 100 may take various forms including a wireless handset, a pager, a personal digital assistant (PDA), a gaming device, or a media player. The mobile device 100 includes a display 502 and a touch-sensitive surface and/or keys 504 for input by a user. The mobile device 100 may present options for the user to select, controls for the user to actuate, and/or cursors or other indicators for the user to direct. The mobile device 100 may further accept data entry from the user, including numbers to dial or various parameter values for configuring the operation of the handset. The mobile device 100 may further execute one or more software or firmware applications in response to user commands. These applications may configure the mobile device 100 to perform various customized functions in response to user interaction. Additionally, the mobile device 100 may be programmed and/or configured over-the-air, for example from a wireless base station, a wireless access point, or a peer mobile device 100. The mobile device 100 may execute a web browser application which enables the display 502 to show a web page. The web page may be obtained via wireless communications with a base transceiver station, a wireless network access node, a peer mobile device 100 or any other wireless communication network or system.

Figure 6:
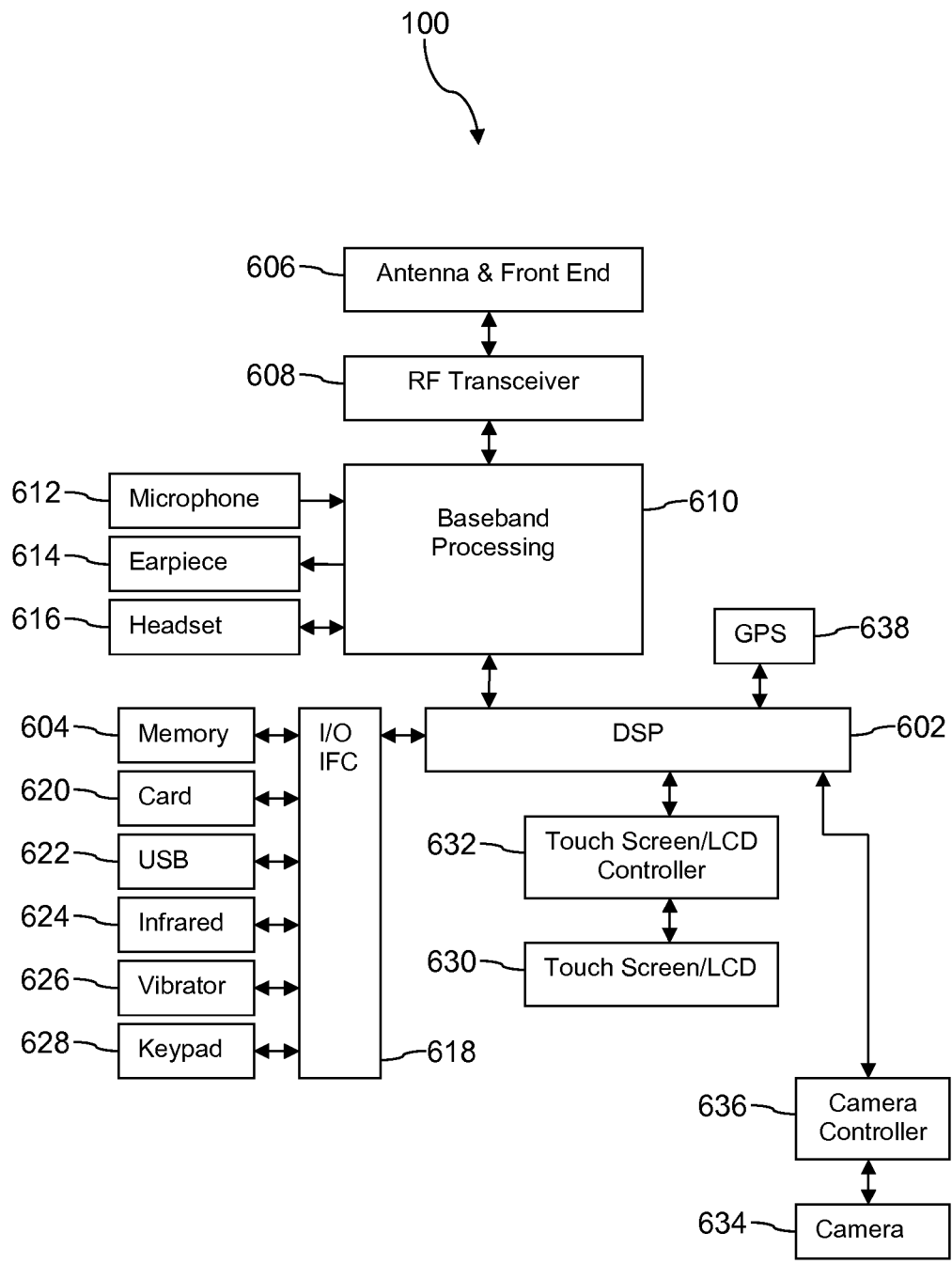
FIG. 6 is a block diagram of a mobile device system suitable for implementing the several embodiments of the disclosure.

FIG. 6 shows a block diagram of the mobile device 100. While a variety of known components of handsets are depicted, in an embodiment a subset of the listed components and/or additional components not listed may be included in the mobile device 100. The mobile device 100 includes a digital signal processor (DSP) 602 and a memory 604. As shown, the mobile device 100 may further include an antenna and front end unit 606, a radio frequency (RF) transceiver 608, a baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a camera 634, a camera controller 636, and a global positioning system (GPS) receiver 638. In an embodiment, the mobile device 100 may include another kind of display that does not provide a touch sensitive screen. In an embodiment, the DSP 602 may communicate directly with the memory 604 without passing through the input/output interface 618. Additionally, in an embodiment, the mobile device 100 may comprise other peripheral devices that provide other functionality.

The DSP 602 or some other form of controller or central processing unit operates to control the various components of the mobile device 100 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 100 to function as a peripheral device to exchange information with a personal computer or other computer system. The infrared port 624 and other optional ports such as a Bluetooth® interface or an IEEE 802.11 compliant wireless interface may enable the mobile device 100 to communicate wirelessly with other nearby handsets and/or wireless base stations.

The keypad 628 couples to the DSP 602 via the interface 618 to provide one mechanism for the user to make selections, enter information, and otherwise provide input to the mobile device 100. Another input mechanism may be the touch screen LCD 630, which may also display text and/or graphics to the user. The touch screen LCD controller 632 couples the DSP 602 to the touch screen LCD 630. The GPS receiver 638 is coupled to the DSP 602 to decode global positioning system signals, thereby enabling the mobile device 100 to determine its position.

Figure 7A:
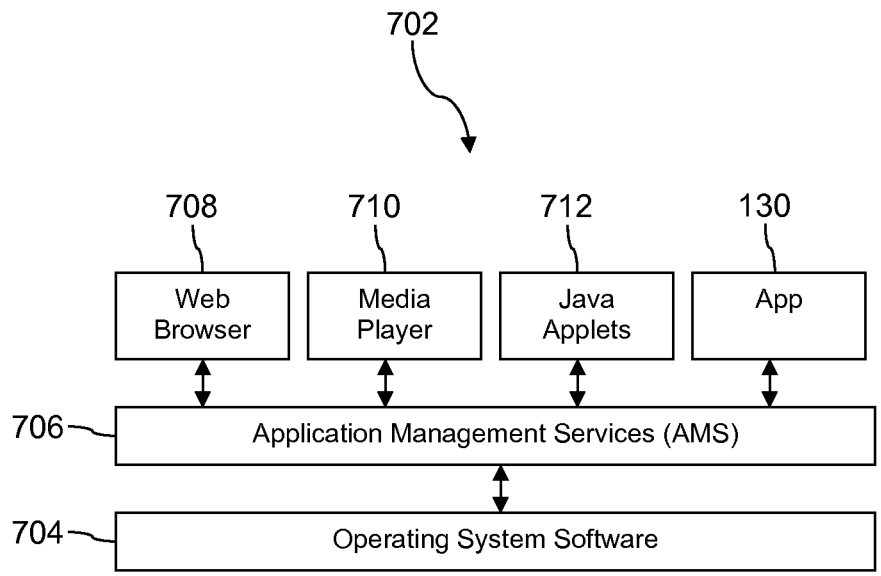
FIG. 7a illustrates a software environment suitable for implementing the several embodiments of the disclosure.

FIG. 7a illustrates a software environment 702 that may be implemented by the DSP 602. The DSP 602 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the mobile device 100. Also shown in FIG. 7a are a web browser application 708, a media player application 710, Java applets 712, and the application 130 of FIGS. 1 and 2. The web browser application 708 may be executed by the mobile device 100 to browse content and/or the Internet, for example when the mobile device 100 is coupled to a network via a wireless link. The web browser application 708 may permit a user to enter information into forms and select links to retrieve and view web pages. The media player application 710 may be executed by the mobile device 100 to play audio or audiovisual media. The Java applets 712 may be executed by the mobile device 100 to provide a variety of functionality including games, utilities, and other functionality.

Figure 7B:
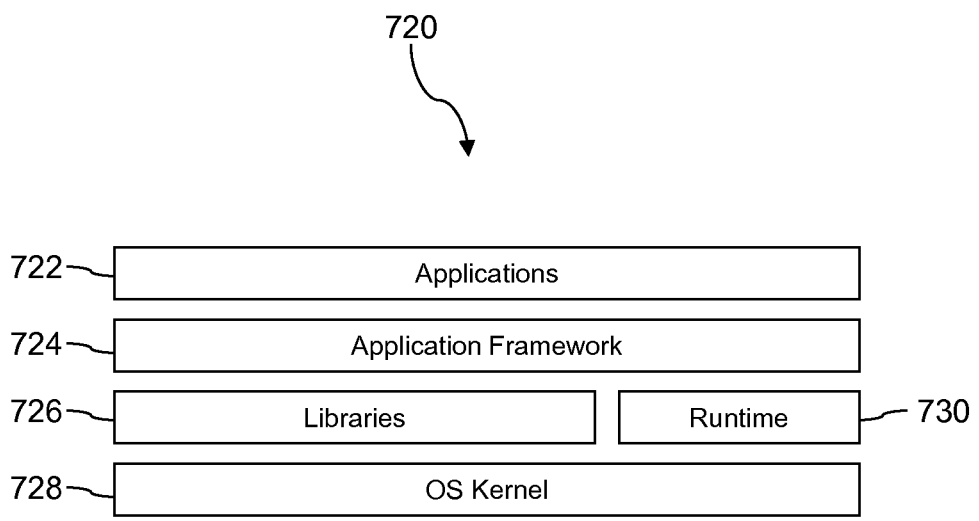
FIG. 7b illustrates an alternative software environment suitable for implementing the several embodiments of the disclosure.

FIG. 7b illustrates an alternative software environment 720 that may be implemented by the DSP 602. The DSP 602 executes operating system software 728 (for example an operating system kernel) and an execution runtime 730. The DSP 602 executes applications 722 that may execute in the execution runtime 730 and may rely upon services provided by the application framework 724. Applications 722 and the application framework 724 may rely upon functionality provided via the libraries 726.

Figure 8:
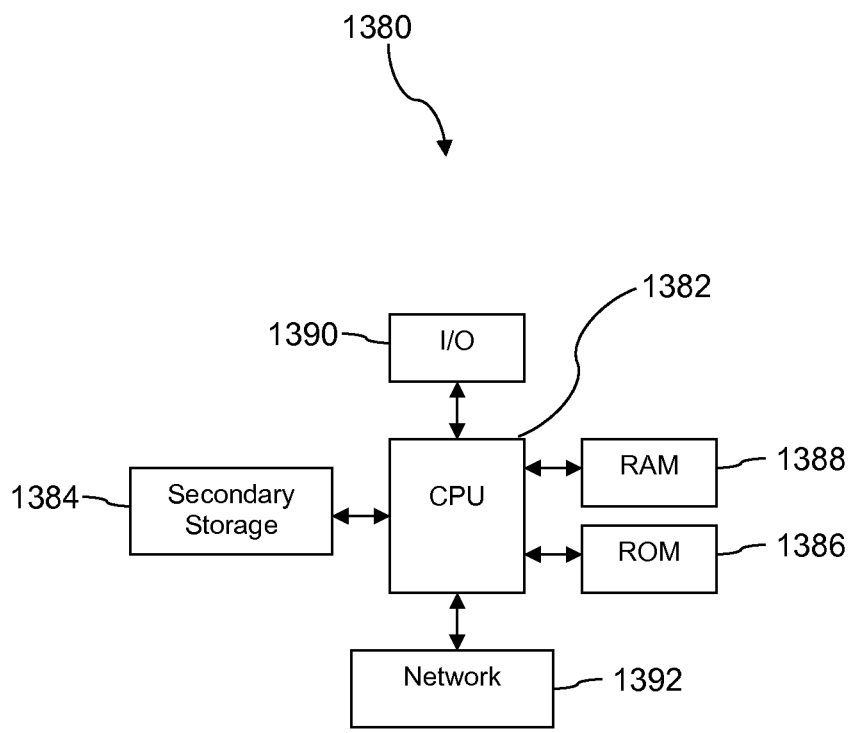
FIG. 8 illustrates an exemplary computer system suitable for implementing the several embodiments of the disclosure.

FIG. 8 illustrates a computer system 1380 suitable for implementing one or more embodiments disclosed herein. The computer system 1380 includes a processor 1382 (which may be referred to as a central processor unit or CPU) that is in communication with memory devices including secondary storage 1384, read only memory (ROM) 1386, random access memory (RAM) 1388, input/output (I/O) devices 1390, and network connectivity devices 1392. The processor 1382 may be implemented as one or more CPU chips.

It is understood that by programming and/or loading executable instructions onto the computer system 1380, at least one of the CPU 1382, the RAM 1388, and the ROM 1386 are changed, transforming the computer system 1380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 1384 is typically comprised of one or more disk drives or tape drives and is used for non-volatile storage of data and as an over-flow data storage device if RAM 1388 is not large enough to hold all working data. Secondary storage 1384 may be used to store programs which are loaded into RAM 1388 when such programs are selected for execution. The ROM 1386 is used to store instructions and perhaps data which are read during program execution. ROM 1386 is a non-volatile memory device which typically has a small memory capacity relative to the larger memory capacity of secondary storage 1384. The RAM 1388 is used to store volatile data and perhaps to store instructions. Access to both ROM 1386 and RAM 388 is typically faster than to secondary storage 1384. The secondary storage 1384, the RAM 1388, and/or the ROM 1386 may be referred to in some contexts as computer readable storage media and/or non-transitory computer readable media.

I/O devices 1390 may include printers, video monitors, liquid crystal displays (LCDs), touch screen displays, keyboards, keypads, switches, dials, mice, track balls, voice recognizers, card readers, paper tape readers, or other well-known input or output devices.

The network connectivity devices 1392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1392 may enable the processor 1382 to communicate with the Internet or one or more intranets. With such a network connection, it is contemplated that the processor 1382 might receive information from the network, or might output information to the network in the course of performing the above-described method steps. Such information, which is often represented as a sequence of instructions to be executed using processor 1382, may be received from and outputted to the network, for example, in the form of a computer data signal embodied in a carrier wave.

Such information, which may include data or instructions to be executed using processor 1382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 1382 executes instructions, codes, computer programs, scripts which it accesses from hard disk, floppy disk, optical disk (these various disk based systems may all be considered secondary storage 1384), ROM 1386, RAM 1388, or the network connectivity devices 1392. While only one processor 1382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1384, for example, hard drives, floppy disks, optical disks, and/or other device, the ROM 1386, and/or the RAM 1388 may be referred to in some contexts as non-transitory instructions and/or non-transitory information.

In an embodiment, the computer system 1380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1380 to provide the functionality of a number of servers that is not directly bound to the number of computers in the computer system 1380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1380, at least portions of the contents of the computer program product to the secondary storage 1384, to the ROM 1386, to the RAM 1388, and/or to other non-volatile memory and volatile memory of the computer system 1380. The processor 1382 may process the executable instructions and/or data structures in part by directly accessing the computer program product, for example by reading from a CD-ROM disk inserted into a disk drive peripheral of the computer system 1380. Alternatively, the processor 1382 may process the executable instructions and/or data structures by remotely accessing the computer program product, for example by downloading the executable instructions and/or data structures from a remote server through the network connectivity devices 1392. The computer program product may comprise instructions that promote the loading and/or copying of data, data structures, files, and/or executable instructions to the secondary storage 1384, to the ROM 1386, to the RAM 1388, and/or to other non-volatile memory and volatile memory of the computer system 1380.

In some contexts, the secondary storage 1384, the ROM 1386, and the RAM 1388 may be referred to as a non-transitory computer readable medium or a computer readable storage media. A dynamic RAM embodiment of the RAM 1388, likewise, may be referred to as a non-transitory computer readable medium in that while the dynamic RAM receives electrical power and is operated in accordance with its design, for example during a period of time during which the computer 1380 is turned on and operational, the dynamic RAM stores information that is written to it. Similarly, the processor 1382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for a mobile communication device to conduct a transaction with an unattended point-of-transaction device, comprising:
    establishing a secure wireless telecommunications link between the mobile communication device and an entity that manages the unattended point-of-transaction device;
    transmitting, by the mobile communication device, confidential information over the link, the confidential information comprising information that establishes the authorization of the mobile communication device to interact with the unattended point-of-transaction device and information regarding an action the unattended point-of-transaction device is requested to perform in conducting the transaction, wherein the action the unattended point-of-transaction device is requested to perform and at least a portion of the information that establishes the authorization of the mobile communication device to interact with the unattended point-of-transaction device have been entered into a user interface on the mobile communication device;
    in response to receiving the confidential information from mobile communication device, verifying, by the entity that manages the unattended point-of-sale transaction device, that the mobile communication device is authorized to interact with the unattended point-of-transaction device;
    in response to the verifying, creating, by the entity that manages the unattended point-of-sale transaction device, a transaction file that specifies the action the unattended point-of-transaction device is to perform in conducting the transaction;
    assigning, by the entity that manages the unattended point-of-sale transaction device, a transaction identifier that uniquely identifies the transaction to the transaction file;
    sending, from the entity that manages the unattended point-of-sale transaction device, the transaction file to the unattended point-of-transaction device;
    receiving, by the mobile communication device, the transaction identifier from the entity that manages the unattended point-of-sale transaction device;
    verifying, by the mobile communication device, the unattended point-of-transaction device by looking up an identity of a proximate unattended point-of-transaction device and comparing the identity of the proximate unattended point-of-transaction device to an identity of the unattended point-of-transaction device;
    transmitting, by the mobile communication device, the transaction identifier to the unattended point-of-transaction device via a near field communication (NFC) transmission;
    comparing, by the unattended point-of-transaction device, the transaction identifier received from the mobile communication device to the transaction identifier made available in the transaction file; and
    when the transaction identifier received from the mobile communication device matches the transaction identifier made available in the transaction file, performing, by the unattended point-of-sale transaction device, the action specified in the transaction file.

2. The method of claim 1, wherein the transaction identifier becomes invalid after the transaction is complete.

3. The method of claim 1, wherein a limit is imposed on a length of time the transaction identifier remains available for transmission by the mobile communication device after being received by the mobile communication device.

4. The method of claim 1, wherein a time window is imposed for the availability of the transaction identifier to be transmitted by the mobile communication device, the time window comprising a start time for availability for transmission and a length of time after the start time.

5. The method of claim 1, wherein the transaction identifier is restricted to being transmitted by the mobile communication device only in at least one designated geographic location.

6. The method of claim 5, wherein the information that establishes the authorization of the mobile communication device to interact with the unattended point-of-transaction device is at least one of:
    account information for an account associated with the transaction and a personal identification number (PIN) associated with the account information;
    a user identifier and a password; and
    biometric information.

7. The method of claim 1, wherein the unattended point-of-transaction device provides at least one credential to the mobile communication device to thereby verify that the unattended point-of-transaction device is legitimate.

8. The method of claim 1, wherein the mobile communication device self-locates and after self-location, looks up the proximate unattended point of transaction device.

9. The method of claim 1, wherein the transaction identifier becomes invalid after one use.

10. The method of claim 1, wherein a user of the mobile communication device designates a time period during which the transaction identifier will be valid.

11. A system for conducting a transaction with an unattended point-of-transaction device, comprising:
    a telecommunications device comprising:
        a memory;
        a processor; and
        an application stored in the memory and executable by the processor to:
            establish a secure wireless telecommunications link between the telecommunications device and an entity that manages an unattended point-of-transaction device,
            transmit confidential information over the link, the confidential information comprising information that establishes the authorization of the telecommunications device to conduct the transaction with the unattended point-of-transaction device and information regarding an action the unattended point-of-transaction device is requested to perform in conducting the transaction, wherein the information regarding the action the unattended point-of-transaction device is requested to perform and at least a portion of the information that establishes the authorization of the telecommunications device to interact with the unattended point-of-transaction device have been entered into a user interface on the telecommunications device, receive from the entity that manages the unattended point-of-transaction device a transaction identifier that uniquely identifies the transaction, verify the unattended point-of-transaction device by looking up an identity of a proximate unattended point-of-transaction device and comparing the identity of the proximate unattended point-of-transaction device to an identity of the unattended point-of-transaction device, and transmit the transaction identifier to the unattended point-of-transaction device via a near field communication (NFC) transmission;

a system of the entity that manages an unattended point-of-transaction device configured to:

in response to receiving the confidential information from the telecommunications device, verify that the telecommunications device is authorized to interact with the unattended point-of-transaction device, in response to the verification, create a transaction file that specifies the action the unattended point-of-transaction device is to perform in conducting the transaction, assign the transaction identifier that uniquely identifies the transaction to the transaction file, and make the transaction file available to the unattended point-of-transaction device; and the unattended point-of-transaction device configured to:

compare the transaction identifier received from the telecommunications device to the transaction identifier made available in the transaction file, and when the transaction identifier received from the telecommunications device matches the transaction identifier made available in the transaction file, perform the action specified in the transaction file.

12. The system of claim 11, wherein the validity of the transaction identifier is limited by at least one of:

a limit imposed on a length of time the transaction identifier remains available for transmission by the telecommunications device after being received by the telecommunications device;

a time window imposed for the availability of the transaction identifier to be transmitted by the telecommunications device, the time window comprising a start time for availability for transmission and a length of time after the start time; and the transaction identifier being restricted to being transmitted by the telecommunications device only in at least one designated geographic location.

13. The system of claim 11, wherein the information that establishes the authorization of the telecommunications device to interact with the unattended point-of-transaction device is at least one of:

account information for an account associated with the transaction and a personal identification number (PIN) associated with the account information;

a user identifier and a password; and biometric information.

14. The system of claim 11, wherein the application is further configured to manage at least one of:

storage and retrieval of at least a portion of the information that establishes the authorization of the telecommunications device to interact with the unattended point-of-transaction device;

transmission of the confidential information over the secure wireless telecommunications link, reception of the transaction identifier over the secure wireless telecommunications link, and transmission of the transaction identifier to the unattended point-of-transaction device via NFC; and erasure of secure information entered into or received by the telecommunications device.

15. The system of claim 11, wherein the unattended point-of-transaction device is further configure to provide at least one credential to the telecommunications device to thereby verify that the unattended point-of-transaction device is legitimate.

16. The system of claim of claim 11, wherein the telecommunications device self-locates and after self-location, looks up the proximate unattended point of transaction device.

17. The system of claim of claim 11, wherein the transaction identifier becomes invalid after one use.

18. The system of claim of claim 11, wherein a user of the telecommunications device designates a time period during which the transaction identifier will be valid.

\* \* \* \* \*